R. E. HELLMUND.
SYSTEM OF CONTROL.
APPLICATION FILED SEPT. 9, 1915.

1,320,049.

Patented Oct. 28, 1919.

WITNESSES:
Fred H. Miller
W. R. Coley

INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,320,049. Specification of Letters Patent. Patented Oct. 28, 1919.

Application filed September 9, 1915. Serial No. 49,749.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to systems of control, and it has special reference to the control of electric-railway vehicle motors and the like that are adapted for regenerative operation.

The object of my invention is to provide, in a system of the above-indicated character, regulating means that is associated with the main regenerating machine for inherently and instantaneously counteracting an incipient variation of the armature current to maintain a substantially constant value thereof.

In the prior art, considerable difficulty has been experienced in the operation of direct-current regenerative systems because of the relatively heavy surges of current that have occurred in the regenerative circuits by reason of the unavoidable voltage fluctuations, for example, whereby flashover troubles and other undesirable conditions have arisen.

According to my present invention, I obviate the above-mentioned difficulty by providing a field winding for the regenerating machine that comprises a plurality of differentially related sections, and an auxiliary exciting armature winding that is likewise provided with a plurality of differentially related field-magnet windings for inherently regulating the voltage of the auxiliary armature winding to supplement the differential action of the main field winding sections and, conjunctively therewith, to maintain a substantially constant regenerated current, as hereinafter more fully set forth.

Figure 1:
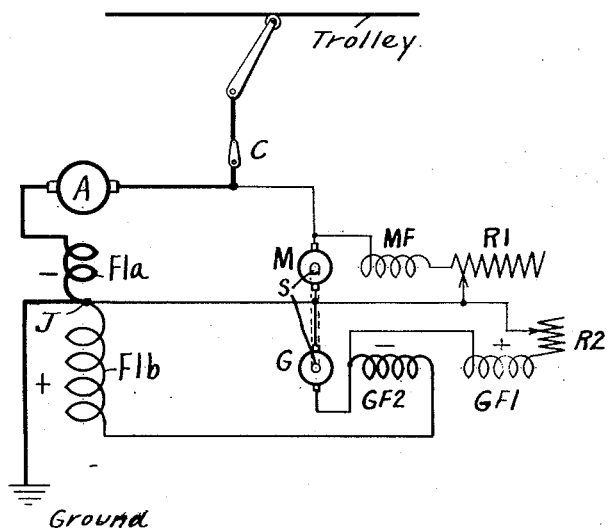
Figure 2:
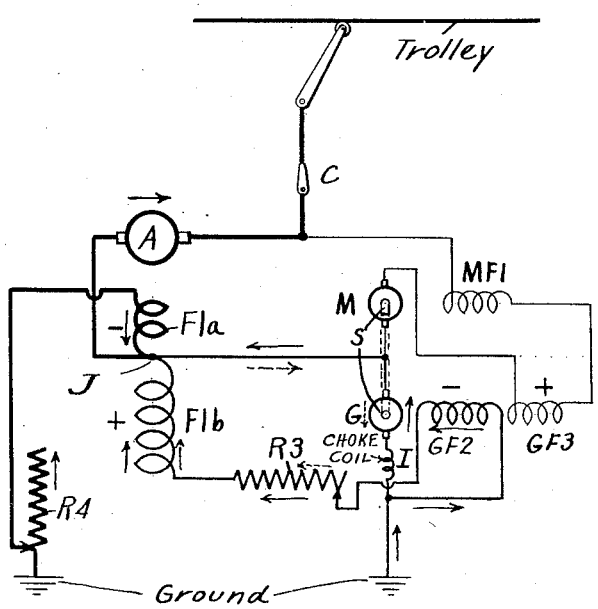

In the accompanying drawing, Figure 1 is a diagrammatic view of a system of control embodying my invention, and Fig. 2 is a similar view of a modification of the system that is illustrated in Fig. 1.

Referring to Fig. 1 of the drawing, the system shown comprises a plurality of suitable supply-circuit conductors, respectively marked Trolley and Ground; a main dynamo-electric machine comprising an armature A and a heavy-wire field-magnet winding having the sections F1$a$ and F1$b$; an auxiliary motor-generator or dynamotor comprising a plurality of armature windings M and G and a plurality of suitable field-magnet windings MF, GF1 and GF2; and a suitable switching device or controller, for manipulating the main-circuit connections in accordance with any familiar practice, that is here conventionally illustrated by the switching device C.

The armature windings M and G may be mechanically associated in any familiar manner, as by a suitable shaft $s$. The shunt field-magnet winding MF is connected in series relation with a variable resistor R1 across the armature winding M, while the shunt field winding GF1 is similarly connected through a variable resistor R2 in parallel relation to the armature winding G. The driving armature winding M is connected in parallel relation to the main armature A and the field-winding section F1$a$, while the exciting armature winding G is connected through a second field-magnet winding GF2 across the main field-winding section F1$b$. The junction-point J of the main field-winding sections F1$a$ and F1$b$ is connected directly to the negative supply-circuit conductor Ground, while one terminal of each of the armature windings A and M is connected through the switching device C to the positive supply-circuit conductor Trolley.

The main field winding sections F1$a$ and F1$b$ are differentially related with respect to each other, the section F1$b$ being adapted to energize the armature A, while the second field-winding section F1$a$ is disposed to deënergize the armature. In other words, the section F1$b$ is adapted to increase the regenerated voltage of the armature A, while the action of the section F1$a$ is to decrease such voltage. The auxiliary field windings GF1 and GF2 are also differentially related with respect to each other, the shunt field winding GF1 being connected to increase the voltage of the exciting armature winding G, while the series-connected field winding GF2 is adapted to decrease the voltage thereof. In the figure, the windings F1b and GF1 are marked with a plus sign to indicate their positive energizing action, while the windings F1a and GF2 are designated by a minus sign to indicate their opposing or deënergizing action.

Assuming that the system is operating under suitable speed conditions by reason of the manipulation of the switching device C and that it is then desired to effect regenerative operation of the system, the connections illustrated are effected by the device C or in any other suitable manner, whereby the regenerated current is maintained at a substantially constant value for the reasons about to be set forth. In case of an incipient variation of the regenerated current, an increase, for instance, by reason of supply-circuit voltage fluctuations or otherwise, the current in the demagnetizing main field-winding section F1a tends to momentarily increase, whereby the effective combined flux of the two sections F1a and F1b is decreased to a predetermined extent, to proportionately decrease the simultaneous regenerated voltage of the armature A. Such a relation of the main field-winding sections of a regenerating machine is not of my present invention but is fully shown and described in my co-pending application, Serial No. 860,612, filed September 8, 1914.

However, it has been found that the desired decrease of regenerated voltage in such a case does not become effective instantaneously, by reason of an increase of the electromotive force induced in the positive field-winding section F1b through the agency of the transformer action that takes place upon the incipient increase of current and the corresponding reduction in the total field-flux conditions. Consequently, when the field-winding sections F1a and F1b only are employed, the current traversing the section F1b is momentarily increased from the desired constant value because of the increased electromotive force referred to. Of course, after a certain period of time, the result of such transformer action disappears, and the above-mentioned desired constant current again obtains. Such a delay is, however, very undesirable and it is to obviate this difficulty and effect an instantaneous suitable decrease of the regenerated voltage that I provide the differentially related auxiliary field-magnet windings GF1 and GF2.

The above-mentioned incipient increase of the current traversing the main field-winding section F1b likewise affects the auxiliary demagnetizing field winding GF2. The demagnetizing action of this increased current in the field winding GF2 immediately effects a corresponding decrease in the voltage delivered by the exciting armature winding G, thus decreasing, to a predetermined extent, the current traversing the main field-winding section F1b. By suitable design and arrangement of parts, the combined action of the regulating means illustrated will be such as to decrease the regenerated armature voltage desirably relative to the incipient increase of current that has been mentioned, thereby maintaining a substantially constant regenerated current at all times. It will be understood that, in case of an incipient decrease of the regenerated current, the converse action of the various groups of differentially related field windings will take place.

Although it has required a description of considerable length to fully explain the conjunctive operation of the two groups of differentially related field windings, it will be appreciated that the action itself takes place substantially instantaneously, so that the incipient increase or decrease of the regenerated current is inherently and immediately counteracted, and the actual variations of the regenerated current from the desired constant value are relatively insignificant.

To compensate for the gradual decrease in the speed of the regenerating machine, the resistor R1 may be gradually increased in value to weaken the field excitation of the armature winding M and, consequently, increase the speed of the motor-generator or dynamotor, and the resistor R2 may be gradually decreased in value to strengthen the excitation of the auxiliary field winding GF1, the result in each case being to effect an increase in the excitation of the main field-winding section F1b, whereby the effective main field excitation is gradually increased during the regenerative period.

Reference may now be had to Fig. 2, wherein the system shown comprises the supply-circuit conductors Trolley and Ground, the main dynamo-electric machine having the armature A and the field-winding sections F1a and F1b, the switching device C, a motor-generator or dynamotor embodying the auxiliary armature windings M and G, and a choke coil or other highly inductive device I.

The armature winding M is provided with a series-type field-magnet winding MF1 that is connected in series relation with a field-magnet winding GF3 for the exciting armature winding G, these two field windings being connected directly between the positively energized switching device C and the armature winding M. The exciting armature winding G is also provided with the series-type field-magnet winding GF2, which is differentially related to the other field-magnet winding GF3. A suitable variable resistor R3 is connected in series relation with the main field-winding section F1b and the auxiliary field winding GF2 across the armature winding G.

One terminal of the main armature A is connected, through the switching device C, to the positive supply-circuit conductor, while the other terminal thereof is connected to the junction-point J of the main field-winding sections F1a and F1b. The outer terminal of the demagnetizing field-winding section F1a is connected through a suitable variable resistor R4 to the negative supply-circuit conductor Ground, to which is also connected one terminal of the exciting armature winding G through the inductive coil I. The resistor R3 is entirely included in circuit when the regenerative period commences, whereby the excitation of the field-winding section F1b from the armature winding G may be increased as the regenerating machine speed decreases, while the resistor R4 is initially, for the most part, excluded from circuit and is gradually increased in value during the regenerative period.

Assuming that the system illustrated is operated to return regenerative energy to the supply circuit and that an incipient increase, for example, of the regenerated current occurs, so that the current traversing the main field-winding section F1a increases, the regulating action of the two groups of differentially related field-magnet windings is substantially similar to that already set forth in connection with Fig. 1, the desired result again being to so proportion the various field-magnet windings that the inherent and instantaneous decrease of the regenerated voltage of the armature A is substantially proportional to the incipient increase of regenerated current mentioned above.

In order to compensate for the decrease in speed of the regenerating machine during the braking period, the active value of the resistor R3 may be gradually decreased in any suitable and well-known manner to correspondingly strengthen the positive energizing action of the field-winding section F1b, whereas the resistor R4 may be either simultaneously, or otherwise, gradually increased in value to effect a reduction of the demagnetizing effect of the main field winding section F1a. In this way the effective main field strength is gradually increased as the speed of the regenerating machine decreases, as will be understood.

An advantage of the system shown in Fig. 2 resides in the double connection to the negative supply-circuit conductor. It will be observed that the highly inductive circuit including the inductive coil I and the armature winding G is connected in parallel relation to the circuit comprising the resistor R4 and the main field-winding section F1a. In this way, a portion of the regenerated current traverses each of the main field-winding sections, and the average current supplied to the section F1b by the armature winding G is considerably smaller than the average current that is delivered by the armature winding G in the system illustrated in Fig. 1, whereby the size, capacity, initial cost, etc., of the motor-generator or dynamotor is correspondingly reduced when the system shown in Fig. 2 is employed. At certain times during the regenerative period, the armature winding G will be called upon to supply hardly any current, although the arrangement of parts is such that the winding G will never act as a motor, such as has been the case in some prior systems, for example, my copending application, Serial No. 39,376, filed July 12, 1915. Consequently, the use of the series field windings MF1 and GF3 alone is permissible in the system illustrated, whereas, in such prior systems, the employment of only series field windings would be liable to cause runaway conditions upon the change of the armature winding G to a series motor armature. The use of series field windings exclusively in the motor-generator or dynamotor that is employed in my invention is advantageous in that flash-over conditions in the armature winding M, by reason of a sudden resumption of supply-circuit voltage after a temporary interruption thereof, are substantially prevented, since the field flux of the armature winding M may thus be built up with sufficient rapidity to obviate excessive flux distortion and consequent flash-over conditions.

It should be noted that upon an incipient increase of current in the regenerating armature A, the greater portion of the increased flow will traverse the circuit including the field-winding section F1a, by reason of the choking action of the inductive coil I, which of course, offers relatively small resistance to the traversal of a steady current.

Such action takes place for the following reasons. The regenerated current is afforded at total of three paths from Ground to the junction-point J, namely, the resistor R4 and main field-winding section F1a; the auxiliary field winding GF2, resistor R3 and main field-winding section F1b; and the inductive coil I and the exciting armature G, through which the exciting current flows in opposition to the corresponding portion of the regenerated currents, as indicated by the various arrows. The increased regenerated current traversing the main field-winding section F1b is of relatively small amount, by reason of the inherent differential regulating action of the auxiliary field winding GF2, as explained in connection with Fig. 1, while the choke-coil action of the device I tends to prevent a surge of regenerated current through the exciting armature G. Consequently, the greater portion of the increased flow is caused to traverse the main-field-winding section F1a. In this way, the desired instantaneous regulating effect will be obtained.

I do not wish to be restricted to the specific circuit connections or arrangement and location of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a supply circuit and a dynamo-electric machine having an armature and a field-magnet winding comprising a first section and a second differentially related section, of an auxiliary source of energy connected to excite the first of said sections, and means responsive to an incipient increase of current in the second of said field-winding sections for substantially instantaneously varying the voltage of said source to counteract said increase.

2. In a system of control, the combination with a supply circuit, and a main dynamo-electric machine having an armature and a field-magnet winding, of means embodied in said machine for inherently counteracting an incipient variation of the armature current by correspondingly changing the field excitation, and external dynamo-electric means embodying differentially-related field windings for counteracting the tendency of the main field winding to retard such changes.

3. In a system of control, the combination with a supply circuit, and a dynamo-electric machine having an armature and also a field-magnet winding comprising a plurality of differentially related sections, of an auxiliary source of energy connected to one of the field-winding sections, and means associated with said source for inherently regulating the voltage thereof to supplement the differential action of the field-winding sections and, conjunctively therewith, to maintain substantially constant armature current.

4. In a system of control, the combination with a supply circuit, and a main dynamo-electric machine having an armature and also a field-magnet winding comprising a plurality of differentially related sections, of an auxiliary exciting armature winding connected to one of the field-winding sections, a driving armature winding for said exciting winding, and a plurality of differentially related field-magnet windings for said auxiliary exciting armature winding respectively energized by the current of one of the main field-winding sections and by the driving armature winding current.

5. In a system of control, the combination with a supply circuit, and a main dynamo-electric machine having an armature and also a field-magnet winding comprising a first section and a second differentially related section having a common junction-point, of an auxiliary exciting armature winding, a driving armature winding for said exciting winding, a plurality of differentially related field-magnet windings for said exciting armature winding respectively energized by the current of the first of the main field-winding sections and by the driving armature winding current, a first and a second variable translating device, means for connecting said first main field-winding section, the associated auxiliary field winding and the first of said translating devices across the exciting armature winding, means for connecting the main armature terminals to one supply-circuit conductor and to the junction-point of the main field-winding sections, respectively, means for connecting one terminal of the exciting armature winding to the other supply-circuit conductor, and means for connecting the outer terminal of the second main field-winding section through the second translating device to said other supply-circuit conductor.

6. In a system of regenerative control, the combination with a supply-circuit, and a momentum-driven dynamo-electric machine having an armature and also a field-magnet winding comprising a first section and a second differentially related section having a common junction-point, the first section being adapted to increase, and the second section to decrease, the regenerated armature voltage, of an auxiliary source of energy, a first and a second variable translating device, means for connecting the first of said devices in circuit with said first field-winding section and said auxiliary source, means for connecting the armature terminals to one supply-circuit conductor and to the junction-point of said field-winding sections, respectively, means for connecting the second translating device intermediate the second field-winding section and the other supply-circuit conductor, means for decreasing the active value of said first translating device to directly strengthen the effect of said first field-winding section, and means for increasing the active value of said second translating device to weaken the effect of said second field-winding section, as the machine speed decreases.

7. In a system of control, the combination with a supply circuit, and a main dynamo-electric machine having an armature and also a field-magnet winding comprising a first section and a second differentially related section having a common junction-point, of an auxiliary exciting armature winding, a driving armature winding for said exciting winding, a plurality of differentially related field-magnet windings for said exciting winding respectively energized by the current of the first of the main field-winding sections and by the driving armature winding current, a first and a second variable translating device, means for connecting said first main field-winding sections, the associated auxiliary field winding and the first of said translating devices across the exciting armature winding, means for connecting the main armature terminals to one supply-circuit conductor and to the junction-point of the main field-winding sections, respectively, means for connecting one terminal of the exciting armature winding to the other supply-circuit conductor, means for connecting the outer terminal of the second main field-winding section through the second translating device to said other supply-circuit conductor, means for decreasing the active value of said first translating device to directly strengthen the effect of said first field-winding section and means for increasing the active value of said second translating device to weaken the effect of said second field-winding section, as the machine speed decreases.

8. In a system of control, the combination with a supply circuit and a main dynamo-electric machine having an armature and a field-magnet winding, of an auxiliary source of excitation for the field winding, and means responsive to variations of the main-machine flux for temporarily varying the voltage of said auxiliary source.

9. In a system of control, the combination with a supply circuit, and a dynamo-electric machine having an armature and a field-magnet winding, of means for causing changes in the field excitation of said machine in accordance with the load thereof, and an auxiliary dynamo-electric machine connected to counteract the natural tendency of the field winding to retard such changes.

In testimony whereof, I have hereunto subscribed my name this 31st day of Aug. 1915.

RUDOLF E. HELMUND.